(No Model.) 2 Sheets—Sheet 1.
G. SCHUSSLER.
WATER FILTER.
No. 603,708. Patented May 10, 1898.
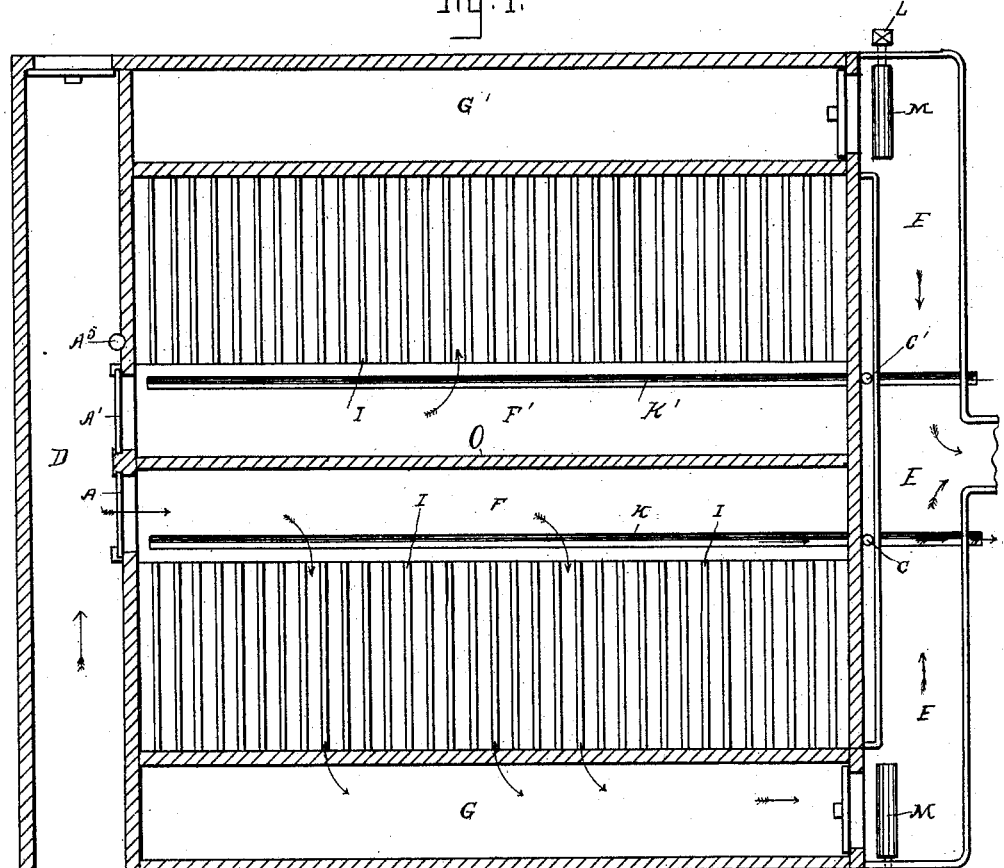
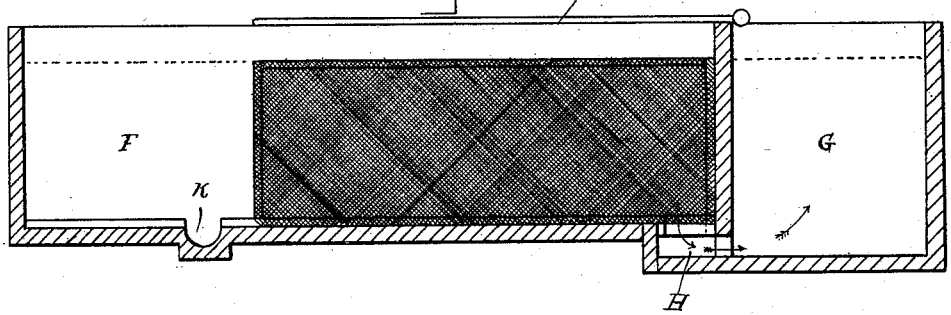
WITNESSES:
Everett M. Coffin
Baldwin Vale
INVENTOR
George Schussler
BY
Boone Ellendorf
ATTORNEYS
THE NORRIS PETERS CO., PHOTO-LITHO., WASHINGTON, D. C.

(No Model.) 2 Sheets—Sheet 2.

G. SCHUSSLER.
WATER FILTER.

No. 603,708. Patented May 10, 1898.

WITNESSES:
Everett M. Coffin
Baldwin Vale

INVENTOR
George Schussler
BY
Boone & Murdock
ATTORNEYS

UNITED STATES PATENT OFFICE.

GEORGE SCHUSSLER, OF SAN FRANCISCO, CALIFORNIA.

WATER-FILTER.

SPECIFICATION forming part of Letters Patent No. 603,708, dated May 10, 1898.

Application filed June 1, 1896. Serial No. 593,956. (No model.)

*To all whom it may concern:*

Be it known that I, GEORGE SCHUSSLER, a citizen of the United States, residing at San Francisco, in the county of San Francisco and State of California, have invented certain new and useful Improvements in Filters; and I do hereby declare the following to be a full, clear, and exact description of said invention, such as will enable others skilled in the art to which it most nearly appertains to make, use, and practice the same.

This invention relates to improvements in water-filters, and has more particular reference to filters which are used in large plants where it is desirable to have continuously-acting apparatus.

The objects which this invention has in view are, first, the cleaning of the filter without necessitating the suspension of the operation of filtering on the part of the apparatus, and, second, the simplification of the details of the filter.

With these objects in view the invention consists in the construction and combination of parts hereinafter particularly set forth and claimed.

Figure 3:
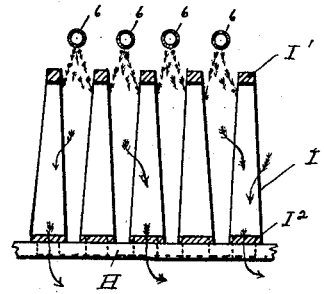

In the drawings, Figure 1 is a plan view, partly in section, of the filter built in accordance with this invention. Fig. 2 is a cross-section of one of the filter-sections, showing in elevation the filter-screens and cleaning spray-pipe. Fig. 3 is a detail view of a group of the screen-frames and their spraying devices, and Fig. 4 is a detail in perspective of one of the screen-frames.

Heretofore the filtering apparatus in common use had consisted principally of a tank divided off into two compartments by a filtering substance, such as sand, charcoal, stone, or cloth. When the latter has been used, it has been sprung on frames, and when the cloths have become polluted the flow of the water-supply has been stopped and the screens taken out and washed off by spraying. When cleaned, they are returned and the water-supply again turned on. This operation, being done by hand, is slow and laborious. The screens have been mounted vertically in the tank, as offering the largest exposed area in that position.

Figure 4:
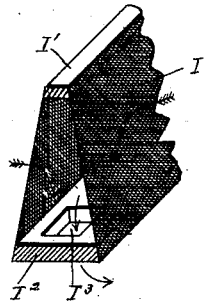

In the present invention the screens I I are mounted on the sides of frames, wedge shape in form, having the narrow tops I' to give them the wedge shape, as shown in Figs. 3 and 4 of the drawings. The ends of these frames are closed by boards fitting the openings. The screen-cloths are tacked onto the sides of the frame and are supported by wire backing, as in the usual forms of this type of filtering-screens. To permit the water to escape from the interior filter-frame after passing through the cloth sides, the bottom $I^2$ is provided with the opening $I^3$, which leads into the channel H on its way to the drains G G'. Where the two openings—that in the channel H and the bottom $I^2$ of screen-sections—come together, they are provided with a rubber gasket to prevent the leakage of water unfiltered through the openings. These screen-sections are held in the present invention against the framework of the apparatus, any suitable means being employed for that purpose. These screens are mounted in series, as shown in Fig. 1, in each section of the tank. The tank is divided in its construction, as illustrated in the drawings, into two sections or compartments, which are separated from each other by a partition O. They are both filled from the common inlet-duct D, the filling being controlled by the gates A A'.

Each of the filtering-sections is provided with two drains G F or G' F', the former, G or G', being separated from the source of supply by the filter-screens and the latter, F or F', receiving the supply direct.

In operation the drains G G' lead into the common duct E, which carries to the reservoir near and remote. The drains F F' are provided to carry off the polluted water during the process of cleaning the screens, and for this purpose they are provided with the gutters K K', which lead into the drainage-pipes that carry the water received by them to waste.

When the cleaning process is not in operation, the gutters are closed by the gates C and C', which when closed prevent the flow of water from the tank by that passage. The screens are sprayed from above, the water being directed on the upturned faces of the screens so that the dirt can be washed therefrom. The screens being mounted as above described are readily cleaned in this way, thus obviating the necessity of their removal from the frames.

Having described my invention, what I claim as new and useful is—

The combination in a filtering-tank of two compartments and a supply-chamber with a series of stationary V-shaped filtering-screens arranged in each compartment, a spraying system for cleaning the said screens, a common inlet-duct for said compartments, gates controlling severally the supply from said duct thereto, drains F, F', arranged to carry off the cleaning-water, additional drains G, G', for conducting the filtered water and a common duct supplied by the latter drains substantially as set forth.

In witness whereof I have hereunto signed my name.

GEORGE SCHUSSLER.

Witnesses:
GEO. T. KNOX,
H. J. LANG.